(No Model.)

J. L. POWLEY.
INKSTAND.

No. 567,792. Patented Sept. 15, 1896.

WITNESSES:
John Buckler.
C. Gersh

INVENTOR
Joseph L. Powley,
BY
Edgar Tate & Co
ATTORNEYS

UNITED STATES PATENT OFFICE.

JOSEPH LEVINUS POWLEY, OF KINGSTON, NEW YORK.

INKSTAND.

SPECIFICATION forming part of Letters Patent No. 567,792, dated September 15, 1896.

Application filed February 29, 1896. Serial No. 581,368. (No model.)

*To all whom it may concern:*

Be it known that I, JOSEPH LEVINUS POWLEY, a citizen of the United States, and a resident of Kingston, in the county of Ulster and State of New York, have invented certain new and useful Improvements in Inkstands, of which the following is a specification, reference being had to the accompanying drawings, forming a part thereof, in which similar letters of reference indicate corresponding parts.

This invention relates to supports for inkstands; and the object thereof is to provide an improved device of this class which is also adapted to serve as a support for pens, and which, in addition to being provided with one or more inkstands or supports therefor, is also provided with a central receptacle for stamps and other articles, over which is placed a hinged cap or cover, which may be be employed as a sponge-receptacle or for other purposes.

The invention is fully disclosed in the following specification, of which the accompanying drawings form a part, in which—

Figure 1:
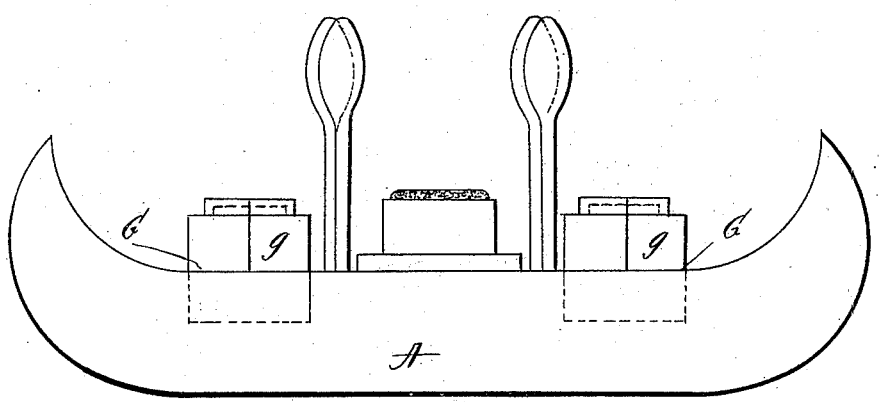
Figure 2:
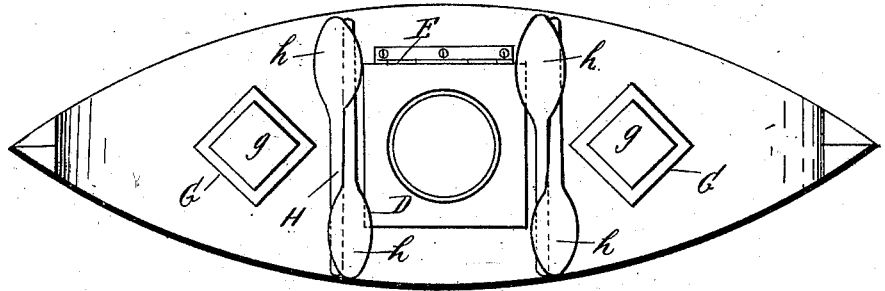
Figure 3:
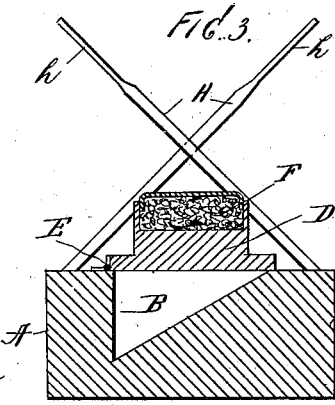

Figure 1 is a side view of my improved holder or support for inkstands and other articles; Fig. 2, a plan view thereof, and Fig. 3 a central transverse section.

In the practice of my invention I provide a support A for inkstands, pens, and other articles, which is preferably shaped in the form of a canoe, and which is provided centrally of its top with a chamber or receptacle B, having a cover D, which is hinged at one side, as shown at E, and in the top of which is formed a chamber or receptacle in which a sponge F or other article may be placed.

At each side of the central portion of the holder is a receptacle G, adapted to receive an inkstand g, and between the receptacle G and the central chamber or cavity B are placed racks, two of which are employed, said racks being adapted to support pens, pencils, or similar articles, and each of said racks being composed of rods or bars H, the upper ends of which are flattened, as shown at h, to resemble canoe-paddles.

Instead of the cover D of the central chamber or receptacle B being employed as a sponge receiver or holder, it may be provided with a pin-cushion, and, as will be observed, this device is simple in construction and may be made as ornamental as desired.

Having fully described my invention, I claim as new and desire to secure by Letters Patent—

The herein-described holder for inkstands and other articles which consists of a canoe-shaped body portion, in the central portion of the top of which is formed a chamber or receptacle which is provided with a hinged cover, and at each side of which is placed an inkstand, the hinged cover for the central chamber or receptacle being adapted to receive a pin-cushion or other article, and said holder being also provided with a rack or support for pens and other articles, which consists of cross-bars arranged at each side of the central chamber or receptacle, substantially as shown and described.

In testimony that I claim the foregoing as my invention I have signed my name, in presence of the subscribing witnesses, this 25th day of February, 1896.

JOSEPH LEVINUS POWLEY.

Witnesses:
WILLIAM WINTER,
ISAAC C. HOTALING.